US005512978A

United States Patent [19]

Mosher et al.

[11] Patent Number: 5,512,978

[45] Date of Patent: Apr. 30, 1996

[54] REPLENISHING SYSTEM

[75] Inventors: Ralph A. Mosher, Rochester; Rasin Moser; James R. Larson, both of Fairport; John S. Berkes, Webster, all of N.Y.

[73] Assignee: Xerox Corporation, Stamford, Conn.

[21] Appl. No.: 463,226

[22] Filed: Jun. 5, 1995

[51] Int. Cl.[6] .................................................... G02G 15/10

[52] U.S. Cl. .......................... 355/203; 355/256; 118/688

[58] Field of Search .................................... 355/208, 246, 355/256, 203; 118/688, 691; 430/113, 115–17

[56] References Cited

U.S. PATENT DOCUMENTS

| | | | |
|---|---|---|---|
| 4,980,259 | 12/1990 | Landa et al. | 430/117 |
| 5,121,164 | 6/1992 | Landa et al. | 355/246 |
| 5,155,001 | 10/1992 | Landa et al. | 430/115 |
| 5,352,558 | 10/1994 | Simms et al. | 430/125 |

*Primary Examiner*—Joan H. Pendegrass
*Attorney, Agent, or Firm*— Lloyd F. Bean, II

[57] ABSTRACT

An apparatus for measuring concentrations of a first vapor pressure carrier fluid component and a second vapor, pressure carrier fluid component in a carrier fluid mixture, including a supply vessel for holding the carrier fluid mixture. A light source is provided for transmitting an infrared light source to the carrier fluid mixture. Detector is provided for detecting infrared light intensity transmitted through the carrier fluid mixture, and, in response thereto, determining infrared absorption of carbon hydrogen stretching frequencies of the carrier fluid mixture. And means are provided for calculating concentrations of the first carrier fluid component and the second carrier fluid component in the mixture based on the infrared absorption of carbon hydrogen stretching frequencies of the carrier fluid mixture. This method can also be extended to a mixture of more than two fluids. A means for maintaining a predetermined ratio of the carrier fluids.

17 Claims, 3 Drawing Sheets

REPLENISHING SYSTEM

FIELD OF THE INVENTION

This invention relates generally to an electrophotographic printing machine, and, more particularly, concerns a method and apparatus for replenishing liquid developers having mixed carrier fluids.

BACKGROUND OF THE INVENTION

The use of liquid developers in electrophotographic printing machines is known. Liquid developers have many advantages, and often result in images of higher quality than images formed with dry toners. The toner particles can be made very small without resulting in problems often associated with small particle powder toners, such as machine dirt which can adversely affect reliability, potential health hazards, limited crushability, and restrictions against the use of coarsely textured papers. Development with liquid developers in full color imaging processes also has many advantages, such as a texturally attractive print because there is substantially no height build-up, whereas full color images developed with dry toners often exhibit height build-up of the image where color areas overlap. Further, full color prints made with liquid developers can be made to a uniformly glossy or a uniformly matte finish, whereas uniformity of finish is difficult to achieve with powder toners because of variations in the toner pile height, the need for thermal fusion, and the like.

Ideally, such liquid developers should be replenishable in the particular equipment in which they are used. In general, high solids concentration toners are used for replenishment because relatively low concentrations (e.g., in the range of 10 to 15% by weight solids) result in greater liquid build-up in the equipment, which then must be removed and disposed of as hazardous waste. Thus, it is desirable to initially use a toner containing less liquid, and to maintain the working source located within the equipment, thereby minimizing the undesirable accumulation of carrier liquid in the equipment. In addition, it is highly desirable and economically attractive to have the liquid vehicle containing the toner particles to be recovered economically and without cross contamination of colorants.

The application of liquid developer to the photoconductive surface clearly depletes the overall amount of liquid developer in the reservoir of an electrocopying or electroprinting machine of this type. In practice, the liquid reservoir is continuously replenished, as necessary, by addition of two liquids from two separate sources, the one providing carrier liquid and the other-a concentrated dispersion of toner particles in the carrier liquid. This is necessary in order to maintain in the carrier liquid in the reservoir a relatively constant concentration of toner particles, because the total amounts of carrier liquid and toner particles utilized per electrocopy vary as a function of the proportional area of the printed portions of the latent image on the photoconductive surface. An original having a large proportion of printed area will cause a greater depletion of toner particles in the liquid developer reservoir, as compared to an original with a small proportion of printed area. Thus, in accordance with the aforementioned practice, the rate of replenishment of carrier liquid is controlled by monitoring the overall amount or level of liquid developer in the reservoir, whereas the rate of replenishment of toner particles (in the form of a concentrated dispersion in carrier liquid) is controlled by monitoring the concentration of toner particles in the liquid developer in the reservoir. An optical float can combine both these functions, i.e. can be utilized to monitor both the overall amount of liquid developer in the reservoir and the toner particle concentration therein. The amount of toner particles utilized per electrocopy varies in proportion to the relative printed area of the image. Thus, a large number of so-called "white" copies (i.e. originals with small printed areas) will result in very small depletion of toner particles whereas the amount of carrier liquid depleted will be comparatively large.

It has been found that it is highly desirable to employ carrier liquid compositions and, in particular, to liquid developers comprised of a mixture of high and low vapor pressure fluids, and wherein there is enabled with such developers excellent fixing characteristics especially when the developed image is transferred from an intermediate substrate to the final substrate, such as paper, reference for example U.S. Pat. No. 5,276,492, the disclosure of which is totally incorporated herein by reference. U.S. application Ser. No. 08/461,829 entitled "LIQUID DEVELOPER COMPOSITIONS" the disclosure of which is totally incorporated herein by reference discloses developers and processes for achieving high fix wherein the developers contains a high vapor pressure fluid, such as an Isopar, like ISOPAR L®, and a low vapor pressure fluid, such as Norpar 15, Superla NF5, and the like, and which low vapor pressure fluid is substantially odorless. The high vapor pressure fluid in embodiments is removed by heat once the developer is transferred to the intermediate substrate, and the low vapor pressure fluid remains with the developer when the developed image is transfixed, that is transferred, fixed and heated simultaneously, to a supporting substrate like paper.

SUMMARY OF THE INVENTION

In accordance with one aspect of the present invention, there is provided an apparatus for measuring concentrations of a first vapor pressure carrier fluid component and a second vapor pressure carrier fluid component in a carrier fluid mixture, including a supply vessel for holding the carrier fluid mixture. Means are provided for transmitting an infrared light source to the carrier fluid mixture. Means are provided for detecting infrared light intensity transmitted through the carrier fluid mixture, and, in response thereto, determining infrared absorption of carbon hydrogen stretching frequencies of the carrier fluid mixture. And means, responsive to said examining means, are provided for calculating concentrations of the first carrier fluid component and the second carrier fluid component in the mixture.

In accordance with another aspect of the present invention, there is provided an electrophotographic printing machine for producing an image on a recording sheet, having means for recording a latent image and means for developing the latent image with liquid developer composed of a first vapor pressure carrier fluid component and a second vapor pressure carrier fluid component in a carrier fluid mixture, said developing means, including means for measuring concentrations of the first vapor pressure carrier fluid component and the second vapor pressure carrier fluid component in a carrier fluid mixture.

DESCRIPTION OF THE DRAWINGS

Other aspects of the present invention will become apparent as the following description proceeds and upon reference to the drawings, in which.

While the present invention will be described in connection with a preferred embodiment and method of use thereof, it will be understood that it is not intended to limit the invention to that embodiment or method of use. On the contrary, it is intended to cover all alternatives, modifications and equivalents that may be included within the spirit and scope of the invention as defined by the appended claims.

DETAILED DESCRIPTION OF THE INVENTION

Figure 1:
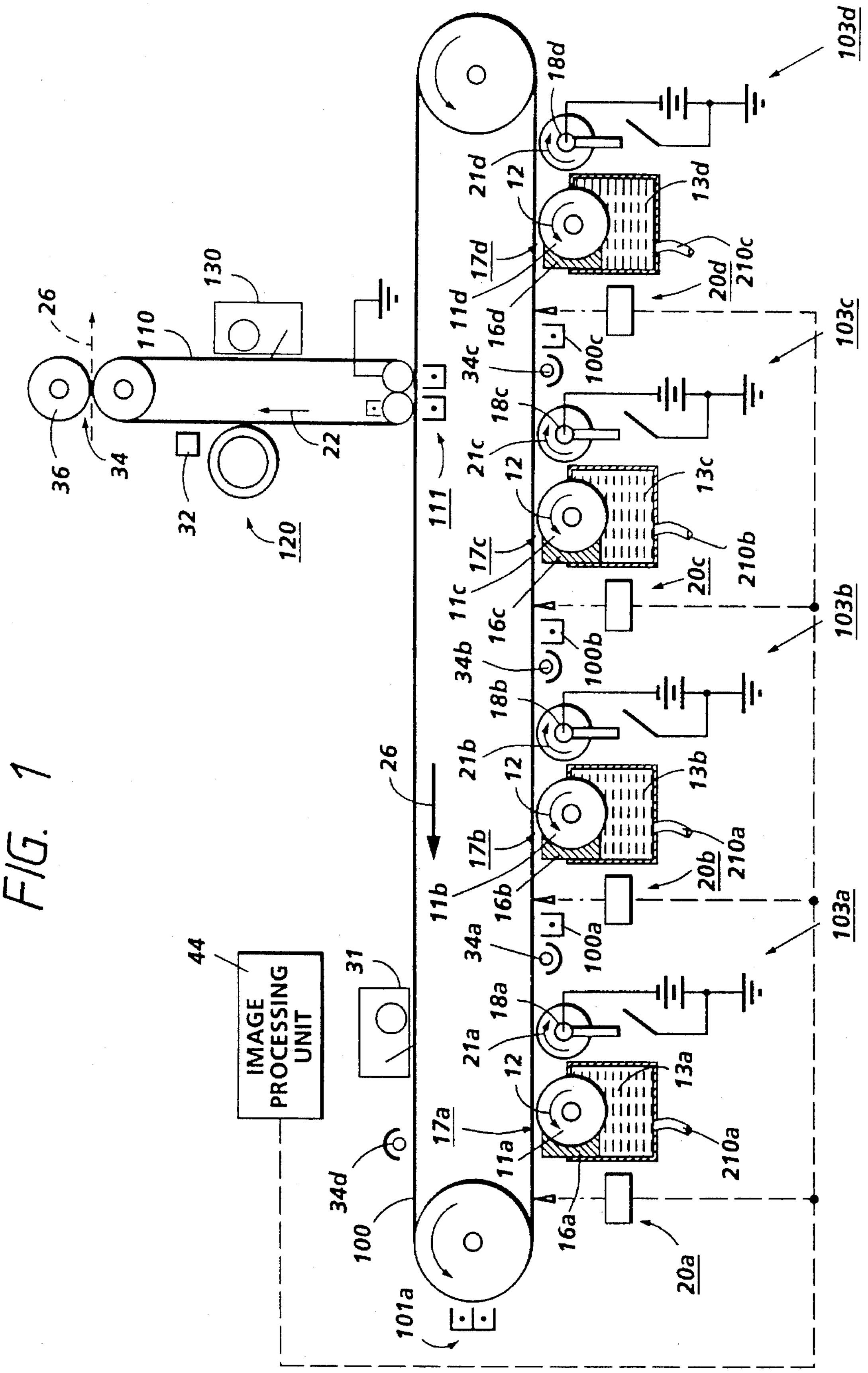
FIG. 1 is a schematic, elevational view of a color electrophotographic printing machine that incorporates the present invention therein.

For a general understanding of the features of the present invention, reference numerals have been used throughout to designate identical elements. FIG. 1 schematically depicts the various elements of an illustrative color electrophotographic printing machine incorporating the present invention therein. It will become evident from the following discussion that the present invention is equally well suited for use in a wide variety of printing machines and is not necessarily limited in its application to the particular embodiment depicted herein.

Inasmuch as the art of electrophotographic printing is well known, the various processing stations employed in the FIG. 1 printing machine will be shown hereinafter schematically and their operation described briefly with reference thereto.

Turning now to FIG. 1, there is shown a color document imaging system incorporating the present invention. The color copy process can begin by inputting a computer generated color image into the image processing unit 44. A digital signals which represent the blue, green, and red density signals of the image are converted in the image processing unit into four bitmaps: yellow (Y), cyan (C), magenta (M), and black (Bk). The bitmap represents the value of exposure for each pixel, the color components as well as the color separation. Image processing unit 44 may contain a shading correction unit, an undercolor removal unit (UCR), a masking unit, a dithering unit, a gray level processing unit, and other imaging processing sub-systems known in the art. The image processing unit 44 can store bitmap information for subsequent images or can operate in a real time mode.

The photoconductive member, preferably a belt of the type which is typically multilayered and has a substrate, a conductive layer, an optional adhesive layer, an optional hole blocking layer, a charge generating layer, a charge transport layer, and, in some embodiments, an anti-curl backing layer. It is preferred that the photoconductive imaging member employed in the present invention be infrared sensitive. This allows improved transmittance through cyan image. Belt 100 is charged by charging unit 101*a*. Raster output scanner (ROS) 20*a*, controlled by image processing unit 44, writes a first complementary color image bitmap information by selectively erasing charges on the belt 100. The ROS 20*a* writes the image information pixel by pixel in a line screen registration mode. It should be noted that either discharged area development (DAD) can be employed in which discharged portions are developed or charged area development (CAD) can be employed in which the charged portions are developed with toner. After the electrostatic latent image has been recorded, belt 100 advances the electrostatic latent image to development station 103*a*. Liquid developer material is supplied by replenishing systems through tube 210 to development station 103*a*, fountain 16A advances a liquid developer material 13*a* from the chamber of housing 14*a* to development zone 17*a*, where it meets roller 11, rotating. Roller 11 is electrically biased to generate a DC field, or AC field with DC offset just prior to the entrance to development zone 17*a* so as to disperse the toner particles substantially uniformly throughout the liquid carrier. The toner particles, disseminated through the liquid carrier, pass by electrophoresis to the electrostatic latent image. The charge of the toner particles is opposite in polarity to the charge on the photoconductive surface.

After the image is developed it is conditioned at development station 103A. Development station 103*a* also includes porous roller 18*a* having porous outer skin. Roller 18*a* receives the developed image on belt 100 and conditions the image by reducing fluid content while inhibiting the offset of toner particles from the image, and by compacting the toner particles of the image. Thus, an increase in percent solids is provided to the developed image, thereby improving the stability of the developed image. Preferably, the percent solids in the developed image is increased to more than 20 percent solids. Porous roller 18*a* operates in conjunction with vacuum 19 (not shown) for removal of liquid from the roller. A roller (not shown), in pressure against the blotter roller 18*a*, may be used in conjunction with or in the place of the vacuum, to squeeze the absorbed liquid carrier from the blotter roller for deposit into a receptacle. Furthermore, the vacuum assisted liquid absorbing roller may also find useful application where the vacuum assisted liquid absorbing roller is in the form of a belt, whereby excess liquid carrier is absorbed through an absorbent foam layer. A belt used for collecting excess liquid from a region of liquid developed images is described in U.S. Pat. Nos. 4,299,902 and 4,258,115, the relevant portions of which are hereby incorporated by reference herein.

In operation, roller 18*a* rotates in direction 20 to impose against the "wet" image on belt 100. The porous body of roller 18*a* absorbs excess liquid from the surface of the image through the skin covering pores and perforations. Vacuum 19 located on one end of the central cavity of the roller, draws liquid that has permeated through roller 18*a* out through the cavity and deposits the liquid in a receptacle or some other location which will allow for either disposal or recirculation of the liquid carrier to the replenishing system of the present invention. Porous roller 18*a*, discharged of excess liquid, continues to rotate in direction 21 to provide a continuous absorption of liquid from image on belt 100. The image on belt 100 advances to lamp 34*a* where any residual charge left on the photoconductive surface is extinguished by flooding the photoconductive surface with light from lamp 34*a*.

The development takes place for the second color for example magenta, as follows: the developed latent image on belt 100 is recharged with charging unit 100*a*. The developed latent image is re-exposed by ROS 20*b*. ROS 20*b* superimposing a second color image bitmap information over the previous developed latent image. At development station 103B, roller 116*b*, rotating in the direction of arrow 12, advances a liquid developer material 13 from the chamber of housing 14 to development zone 17*b*. Fountain 16*b* positioned before the entrance to development zone 17*b* disperses the toner particles substantially uniformly throughout the liquid carrier. The toner particles, disseminated through the liquid carrier, pass by electrophoresis to the previous developed image. The charge of the toner particles is opposite in polarity to the charge on the previous developed image. Roller 18*b* receives the developed image on belt 100 and conditions the image by reducing fluid content while inhibiting the departure of toner particles from the image, and by compacting the toner particles of the image. Preferably, the percent solids is more than 20 percent, however, the percent of solids can range between 15 percent and 40 percent. The image on belt 100 advances to lamps 34*b* where any residual charge left on the photoconductive surface is extinguished by flooding the photoconductive surface with light from lamp 34*b*.

The resultant image, a multi layer image by virtue of the developing station 103*a*, 103*b*, 103*c* and 103*d* having black, yellow, magenta, and cyan, toner disposed therein advances to the intermediate transfer station. It should be evident to one skilled in the art that the color of toner at each development station could be in a different arrangement. The resultant image is electrostatically transferred to the intermediate member by charging device 111. The present invention takes advantage of the dimensional stability of the intermediate member to provide a uniform image deposition stage, resulting in a controlled image transfer gap and improved image registration. Further advantages include reduced heating of the recording sheet as a result of the toner or marking particles being pre-melted, as well as the elimination of electrostatic transfer of charged particles to a recording sheet. Intermediate member 110 may be either a rigid roll or an endless belt having a path defined by a plurality of rollers in contact with the inner surface thereof. The multi layer image is conditioned by blotter roller 120 which receives the multi level image on intermediate member 110 and conditions the image by reducing fluid content while inhibiting the departure of toner particles from the image, and by compacting the toner particles of the image. Blotter roller 120 conditions the multi layer so that the image has a toner composition of up to 50 percent solids.

Subsequently, multi layer image, present on the surface of the intermediate member, is advanced through image liquefaction stage B. Within stage B, which essentially encompasses the region between when the toner particles contact the surface of member 110 and when they are transferred to recording sheet 26, the particles are transformed into a tackified or molten state by heat which is applied to member 110 internally or externally. Preferably, the tackified toner particle image is transferred, and bonded, to recording sheet 26 with limited wicking by the sheet. More specifically, stage B includes a heating element 32, which not only heats the external surface of the intermediate member in the region of transfuse nip 34, but because of the mass and thermal conductivity of the intermediate member, generally raises the outer wall of member 110 at a temperature sufficient to cause the toner particles present on the surface to melt. The toner particles on the surface, while softening and coalescing due to the application of heat from the exterior of member 110, maintain the position in which they were deposited on the outer surface of member 110, so as not to alter the image pattern which they represent. The member continues to advance in the direction of arrow 22 until the tackified toner particles reach transfusing stage C. At transfuse nip 34, the liquefied toner particles are forced, by a normal force N applied through backup pressure roll 36, into contact with the surface of recording sheet 26. Moreover, recording sheet 26 may have a previously transferred toner image present on a surface thereof as the result of a prior imaging operation, i.e. duplexing. The normal force N, produces a nip pressure which is preferably about 100 psi, and may also be applied to the recording sheet via a resilient blade or similar spring-like member uniformly biased against the outer surface of the intermediate member across its width.

As the recording sheet passes through the transfuse nip the tackified toner particles wet the surface of the recording sheet, and due to greater attractive forces between the paper and the tackified particles, as compared to the attraction between the tackified particles and the liquid-phobic surface of member 110, the tackified particles are completely transferred to the recording sheet as image marks. Furthermore, as the image marks were transferred to recording sheet 26 in a tackified state, they become permanent once they are advanced past transfuse nip and allowed to cool below their melting temperature. The transfusing of tackified marking particles has the further advantage of only using heat to pre-melt the marking particles, as opposed to conventional heated-roll fusing systems which must not only heat the marking particles, but the recording substrate on which they are present.

After the developed image is transferred to intermediate member 110, residual liquid developer material remains adhering to the photoconductive surface of belt 100. A cleaning roller 31 formed of any appropriate synthetic resin, is driven in a direction opposite to the direction of movement of belt 100 to scrub the photoconductive surface clean. It is understood, however, that a number of photoconductor cleaning means exist in the art, any of which would be suitable for use with the present invention. Any residual charge left on the photoconductive surface is extinguished by flooding the photoconductive surface with light from lamp 34*d*.

Figure 2:
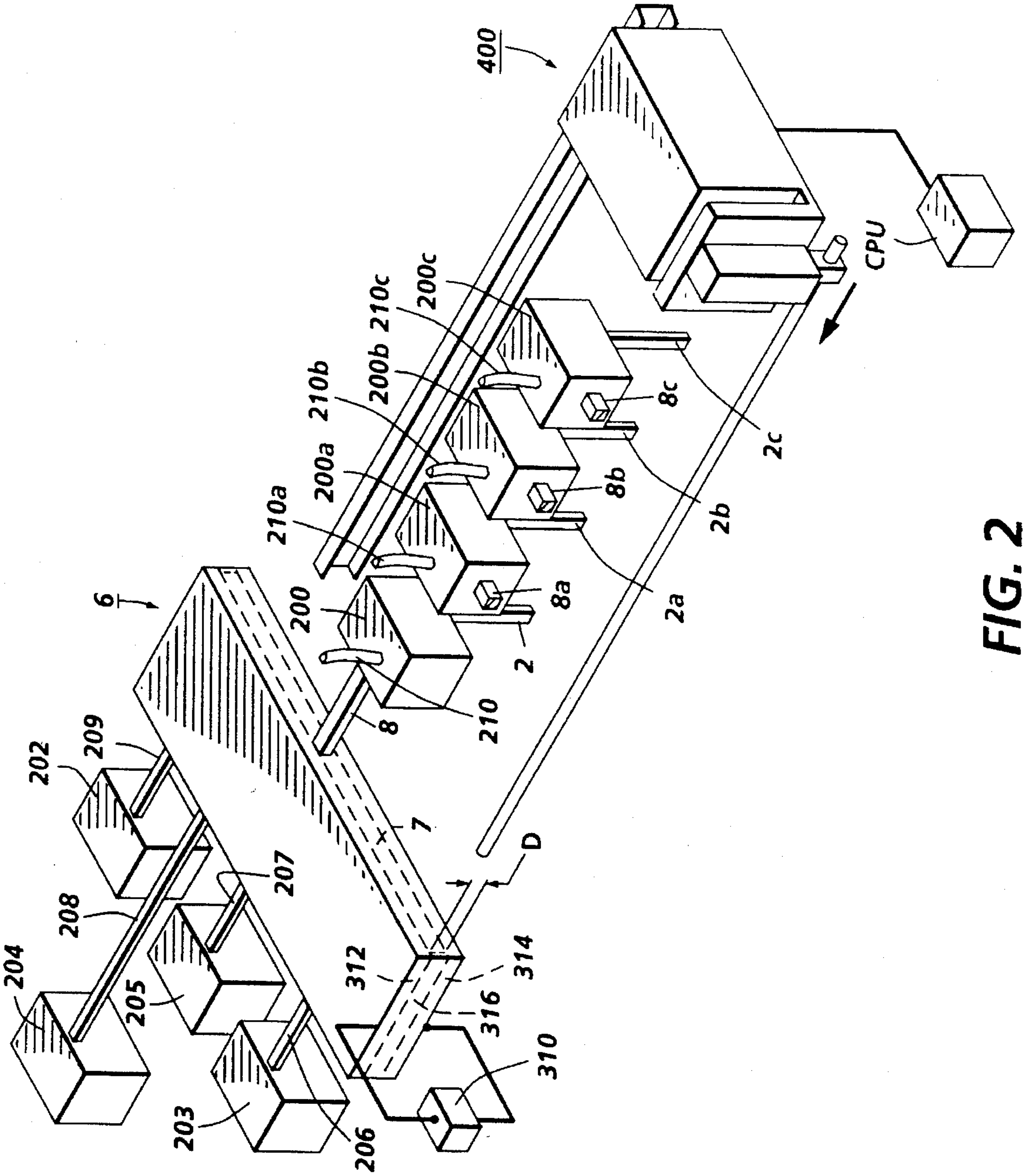
FIG. 2 is a schematic of a system wherein liquid electrostatic developer is replenished by means of supplied dispersed toner in accordance with the invention.
Figure 3:
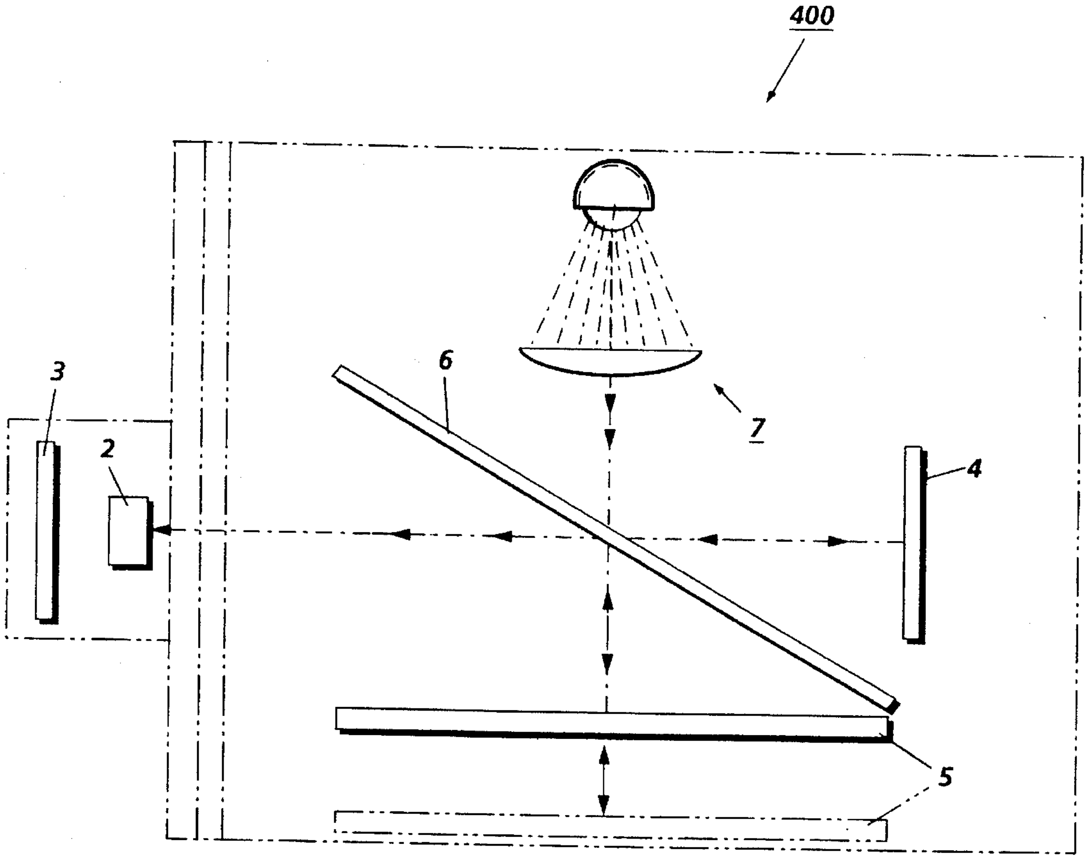
FIG. 3 is a schematic of a Fourier transform (ft) ir spectroscopy monitoring system in accordance with the invention.

Now referring to the replenishing system of the present invention for illustrative clarity one replenishing system is shown connected to supply vessel 200, however supply vessels 200*a*, 200*b* and 200*c* have separated replenishing system (not shown) connected thereto. FIG. 2 illustrates an embodiment of the invention wherein supply vessel 200 contains a liquid developer consisting essentially of (A) a nonpolar carrier liquid having a Kauri-butanol value of less than 30 and a high vapor pressure, (B) a nonpolar carrier liquid having a Kauri-butanol value of less than 30 a low vapor pressure. The mixture of carrier liquids (A and B) contains from about 50 to about 75 weight percent of the high vapor pressure fluid, and from about 50 to about 25 weight percent of the low vapor pressure fluid, (C) thermoplastic resin particles (toner particles) having a median particle size (volume weighted) less than 15 μm, and with 90% of the particles (volume weighted) less than 30 μm which optionally may contain a dispersed colorant, and (D) a charge director compound, the percent of solids in the developer being abut 0.5 to 6% by weight based on the total weight of liquid developer. The liquid electrostatic developer may contain unspecified components that do not prevent the advantage of the liquid developer from being realized. The replenishment system enables the concentration of solids in the liquid developer to be maintained in the range of about 0.5 to 6% by weight, based on the total weight of liquid developer, using a liquid developer contained in supply vessel 200.

The carrier liquids and developer solids concentration in supply vessel 200 are monitored by Fourier transform (ft) ir spectroscopy monitoring system. The (ft) ir spectroscopy monitoring system is movable by means of a motor and a controller (not shown) between monitoring cells 2, 2_a_, 2_b_, 2_c_ of their respective supply vessels. Each monitoring cells comprises an infrared transmitting substance such as halide salt crystals; NaCl, KBr, etc. or other infra-red transmitting materials such as germanium or silicon wafer. The cell gap should be in the range of 0.015 to 1.0 mm.

The FTIR spectroscopy monitoring system operates as follows: Infrared radiation from the source (1) is collimated and is directed through the optical path of the spectrometer. It is first directed through a Michelson interferometer, then it is focused on and transmits through the sample (in monitoring cell 2) and finally is focused on an infrared detector 3. The Michelson interferometer is a device that can divide a beam of radiation into two paths and then recombine the two beams after a path difference has been introduced. This creates a condition under which interference between the two beams can occur. Variations in intensity of the beam emerging from the interferometer can be measured as a function of path difference by a detector. The Michelson interferometer has two mutually perpendicular plane mirrors 4 and 5, one of which is moved at a constant velocity along an axis perpendicular to its plane. A beamsplitter 6 is positioned between the fixed and movable mirrors such that a beam of radiation from an external source can be partially reflected to the fixed mirror (4) and partially transmitted to the movable mirror (5). A difference in path length is introduced and as a consequence, the two beams interfere when they return to the beamsplitter. Because of this interference, the intensity of the two beams passing to the detector depends on the difference in path length of the beams in the two arms of the interferometer. This intensity variation at the detector ultimately yields the spectral information in a Fourier transform spectrometer. Monochromatic radiation produces a cosine wave as the optical paths are varied while a polychromatic source produces an interferogram, or time domain spectrum, which is simply a superposition of all the cosine waves corresponding to the individual frequency components present. The infrared spectrum is calculated from this interferogram by computing the cosine Fourier transform.

The present invention employs the P-matrix to calculate the concentrations from infrared absorption of carbon hydrogen stretching frequencies of individual developer components. The P-matrix has been described in Brown, C. W. "Multicomponent infrared analysis using P-matrix methods", J. Test. Eval 12, 86 (1984) the disclosure of which is totally incorporated herein by reference. The P-matrix changes the formulation of Beer's law to:

$$C=PA$$

where:

C is the matrix of concentrations

P is the matrix relating absorbance to concentration

A is the matrix of absorbances

In operation, a set of standands is run with developer components having known concentrations. From that the absorbance data the P matrix is calculated:

$$P=CA'(AA')^{-1}$$

Then, when an unknown monitoring cell of a vessel is run, the concentrations can be found immediately:

$$C=PA$$

Specific embodiments of the invention will now be described in detail. These examples are intended to be illustrative, and the invention is not limited to the materials, conditions, or process parameters set forth in these embodiments. All parts and percentages are by weight unless otherwise indicated. Comparative Examples are also provided.

EXAMPLE 1

Below is an example of the application of this method to a two component carrier fluid.

TABLE 1

Comparison of Actual weight % versus FTIR Multicomponent Analysis weight % of Individual Components in Mixed LID Carrier Fluids.

| Test | Actual % | | | Analytical % | | |
|---|---|---|---|---|---|---|
| Solution | Isopar-L | Superla | Norpar-15 | Isopar-L | Superla | Norpar-15 |
| A | 50.0 | 50.0 | — | 50.2 | 49.8 | — |
| B | 75.0 | 25.0 | — | 75.6 | 24.4 | — |

EXAMPLE 2

This method extended to three component carrier fluids.

TABLE 2

Comparison of Actual weight % versus FTIR Multicomponent Analysis weight % of Individual Components in Mixed LID Carrier Fluids.

| Test | Actual % | | | Analytical % | | |
|---|---|---|---|---|---|---|
| Solution | Isopar-L | Superla | Norpar-15 | Isopar-L | Superla | Norpar-15 |
| C | 65.0 | 30.0 | 5.0 | 65.3 | 30.4 | 4.2 |

The ingredients for the liquid developer are obtained from at least one liquid toner concentrate vessel 202 that contains aggregates of thermoplastic resin particles having a median particle size (volume weighted) greater than 15 μm, with 90% of the particles (volume weighted) not less than 30 μm. The concentrate is composed of 30 to 100% by weight of such particles and to 70% by weight nonpolar liquid (A or B). Vessel 203 contains liquid component (A). Vessel 204 contains liquid component (B). Vessel 205 contains unknown concentration reclaimed mixture of liquid components (A and B). Means 206, 207, 208 and 209 respectively communicate with concentrate vessel 202 and liquid vessels 203, 204, 205 connecting said vessels with dispersing vessel 6 in order to supply vessel 6 with liquid toner concentrate from vessel 202 and nonpolar liquid from vessels 203, 204, 205. Communicating means 206, 207, 208 and 209 can be pipes, tubes, conduits, or the like, through which the toner concentrate and nonpolar liquid are supplied and metered (by means not shown) into vessel 6. Metering devices can be solenoid metering pumps, piston pumps, metered feed screws, peristaltic pumps, diaphragm pumps, or other metering devices selected on the basis of the physical characteristics of the material being transported. Metering devices are responsive to the monitoring system so that liquid developer can be adjusted to have desired concentration of each component in vessel 200.

Dispersing vessel 6 contains means for providing an electric field as shown in FIG. 2 as described in U.S. application Ser. No. 08/317,009 (D/94171) entitled "SYS- TEM FOR REPLENISHING ELECTROSTATIC LIQUID DEVELOPERS", the disclosure of which is totally incorporated herein by reference. Vessel 6 comprises two conductive plates 312 and 314 separated at the perimeter by an insulator 316. Conductive plates 312 and 314 are connected to voltage supply 310. When voltage is supplied to the plates 312 and 314, an electric field is transmitted through dispersing vessel 6, which enable agglomerates of the ink or developer to break apart or fracture thereby providing for the efficient desirable dispersion of the ink solids in the ink carrier fluids.

Means 8, communicating with dispersing vessel 6, connects the vessel with supply vessel 200 containing the liquid developer to be replenished. Communicating means 8 can be pipes, tubes, conduits, or the like, through which the dispersed toner particles are supplied and metered (by means not shown) into said vessel as required to maintain the developer solids concentration in vessel 200 as measured by the solids concentration sensor (not shown). The metering device can be solenoid metering pumps, metered feed screws, peristaltic pumps, piston pumps, diaphragm pumps, or other metering characteristics of the material being transported.

At least one of supply vessel 200, liquid toner concentrate vessel 202 or liquid vessel 203, can contain a charge director compound, more fully described below, in an amount of 0.1 to 1000 milligrams per gram of developer solids, preferably 1 to 300 milligrams per gram of developer solids. The specific ingredients used to make up the composition of the liquid electrostatic developer are described more fully as follows.

Examples of high pressure liquid carriers selected for the developers of the present invention include a liquid with viscosity of from about 0.5 to about 500 centipoise, preferably from about 1 to about 20 centipoise, and a resistivity greater than or equal to about $5\times10^9$ ohm/centimeters, such as $10^{13}$ ohm/centimeters, or more, such as a branched chain aliphatic hydrocarbon, like the ISOPAR® series, available from the Exxon Corporation. These hydrocarbon liquids are considered narrow portions of isoparaffinic hydrocarbon fractions with extremely high levels of purity. For example, the boiling range of ISOPAR G® is between about 157° C. and about 176° C.; ISOPAR H® is between about 176° C. and about 191° C.; ISOPAR K® is between about 177° C. and about 197° C.; ISOPAR L® is between about 188° C. and about 206° C.; ISOPAR M® is between about 207° C. and about 254° C.; and ISOPAR V® is between about 254° C. and about 329° C.; ISOPAR L® has a mid-boiling point of approximately 194° C.; ISOPAR M® has an auto ignition temperature of 338° C. ISOPAR G® has a flash point of 40° C. as determined by the tag closed cup method; ISOPAR H® has a flash point of 53° C. as determined by the ASTM D-56 method; ISOPAR L® has a flash point of 61° C. as determined by the ASTM D-56 method; and ISOPAR M® has a flash point of 80° C. as determined by the ASTM D-56 method. The liquids selected are known and should have an electrical volume resistivity in excess of about $10^9$ ohm-centimeters and a dielectric constant below or equal to 3.0. Moreover, the vapor pressure at 25° C. should be less than or equal to 10 Torr in embodiments.

Examples of low vapor pressure carrier fluids, or liquids include the NORPAR® series available from Exxon Corporation, the SOLTROL® series from the Phillips Petroleum Company, and the SHELLSOL® series from the Shell Oil Company can be selected.

The amount of the liquid employed in the developer of the present invention is from about 90 to about 99.9 percent, and preferably from about 95 to about 99 percent by weight of the total developer dispersion. The total solids content of the developers is, for example, 0.1 to 10 percent by weight, preferably 0.3 to 3 percent, and more preferably, 0.5 to 2.0 percent by weight.

The toner particles can be any colored particle compatible with the liquid medium, such as those contained in the developers disclosed, for example, in U.S. Pat. Nos. 3,729,419; 3,841,893; 3,968,044; 4,476,210; 4,707,429; 4,762,764; and 4,794,651; and U.S. application Ser. No. 08/268,608 the disclosures of each of which are totally incorporated herein by reference. The toner particles can consist solely of pigment particles, or may comprise a resin and a pigment; a resin and a dye; or a resin, a pigment, and a dye. Suitable resins include poly(ethyl acrylate-co-vinyl pyrrolidone), poly(N-vinyl-2-pyrrolidone), and the like. Other examples of suitable resins are disclosed in U.S. Pat. No. 4,476,210, the disclosure of which is totally incorporated herein by reference. Suitable dyes include Orasol Blue 2GLN, Red G, Yellow 2GLN, Blue GN, Blue BLN, Black CN, Brown CR, all available from Ciba-Geigy, Inc., Mississauga, Ontario, Morfast Blue 100, Red 101, Red 104, Yellow 102, Black 101, Black 108, all available from Morton Chemical Company, Ajax, Ontario, Bismark Brown R (Aldrich), Neolan Blue (Ciba-Geigy), Savinyl Yellow RLS, Black RLS, Red 3GLS, Pink GBLS, all available from Sandoz Company, Mississauga, Ontario, and the like. Dyes generally are present in an amount of from about 5 to about 30 percent by weight of the toner particle, although other amounts may be present provided that the objectives of the present invention are achieved. Suitable pigment materials include carbon blacks such as Microlith® CT, available from BASF, Printex® 140 V, available from Degussa, Raven® 5250 and Raven® 5720, available from Columbian Chemicals Company. Pigment materials may be colored, and may include magenta pigments such as Hostaperm Pink E (American Hoechst Corporation) and Lithol Scarlet (BASF), yellow pigments such as Diarylide Yellow (Dominion Color Company), cyan pigments such as Sudan Blue OS (BASF), and the like. Generally, any pigment material is suitable provided that it consists of small particles and that it combines well with any polymeric material also included in the developer composition. Pigment particles are generally present in amounts of from about 5 to about 40 percent by weight of the toner particles, and preferably from about 10 to about 30 percent by weight. The toner particles should have an average particle diameter from about 0.2 to about 10 microns, and preferably from about 0.5 to about 2 microns. The toner particles may be present in amounts of from about 1 to about 10, and preferably from about 2 to about 4 percent by weight of the developer composition.

Examples of suitable charge control agents include lecithin (Fisher Inc.); OLOA 1200, a polyisobutylene succinimide available from Chevron Chemical Company; basic barium petronate (Witco Inc.); zirconium octoate (Nuodex); aluminum stearate; salts of calcium, manganese, magnesium and zinc; heptanoic acid; salts of barium, aluminum, cobalt, manganese, zinc, cerium, and zirconium octoates; salts of barium, aluminum, zinc, copper, lead, and iron with stearic acid; and the like. The charge control additive may be present in an amount of from about 0.01 to about 3 percent by weight, and preferably from about 0.02 to about 0.05 percent by weight of the developer composition.

It is, therefore, evident that there has been provided, in accordance with the present invention, a replenishing system that fully satisfies the aims and advantages hereinbefore set forth. While this invention has been described in conjunction with one embodiment thereof, it is evident that many alternatives, modifications and variations will be apparent to those skilled in the art. Accordingly, it is intended to embrace all such alternatives, modification and variations as fall within the spirit and broad scope of the appended claims.

We claim:

1. An apparatus for measuring concentrations of a first vapor pressure carrier fluid component and a second vapor/pressure carrier fluid component in a carrier fluid mixture, comprising:

a supply vessel for holding the carrier fluid mixture;

means for transmitting an infrared light source to the carrier fluid mixture;

means for detecting infrared light intensity transmitted through the carrier fluid mixture, and, in response thereto, determining infrared absorption of carbon hydrogen stretching frequencies of the carrier fluid mixture; and means, responsive to said detecting means, for calculating concentrations of the first carrier fluid component and the second carrier fluid component in the mixture.

2. The apparatus of claim 1, wherein said transmitting means comprises a monitor cell in communication with said supply vessel.

3. The apparatus of claim 1, wherein said calculating means calculates the concentration of the first carrier fluid component and the second carrier fluid component as a function of:

$$C=PA$$

where:

C is a matrix of concentrations of first carrier fluid component and the second carrier fluid component P is a matrix relating absorbance to concentration A is a matrix of absorbances.

4. The apparatus of claim 1, further comprises a replenishing system for supplying the first component and the second component to said supply vessel in response to the concentration thereof calculated by said calculating means.

5. The apparatus of claim 4, wherein said replenishing system comprises:

a first carrier fluid vessel coupled to said supply vessel;

a second carrier fluid vessel coupled to said supply vessel; and means, responsive said calculating means, for metering dispensing of the first carrier fluid component from said first carrier fluid vessel and the second carrier fluid component from said second carrier fluid vessel into said supply vessel.

6. The apparatus of claim 1, wherein the first vapor pressure carrier fluid has substantially higher vapor pressure than the second vapor pressure carrier fluid.

7. An apparatus according to claim 3, wherein the carrier fluid mixture, further comprises a thermoplastic resin.

8. The apparatus of claim 7, wherein C is the matrix of concentrations of first vapor pressure carrier fluid, second vapor pressure carrier fluid and thermoplastic resin.

9. An electrophotographic printing machine for producing an image on a recording sheet, having means for recording a latent image and means for developing the latent image with liquid developer composed of a first vapor pressure carrier fluid component and a second vapor/pressure carrier fluid component in a carrier fluid mixture, said developing means, comprising:

means for measuring concentrations of the first vapor pressure carrier fluid component and the second vapor pressure carrier fluid component in a carrier fluid mixture.

10. The electrophotographic printing machine of claim 9, further comprising:

a supply vessel for holding the carrier fluid mixture;

means for transmitting an infrared light source to the carrier fluid mixture;

means for detecting infrared light intensity transmitted through the carrier fluid mixture, and, in response thereto, determining infrared absorption of carbon hydrogen stretching frequencies of the carrier fluid mixture; and means, responsive to said detecting means, for calculating concentrations of the first carrier fluid component and the second carrier fluid component in the mixture.

11. The apparatus of claim 10, wherein said transmitting means comprises a monitor cell in communication with said supply vessel.

12. The apparatus of claim 11, wherein said calculating means calculates the concentration of the first carrier fluid component and the second carrier fluid component as a function of:

$$C=PA$$

where:

C is a matrix of concentrations of first carrier fluid component and the second carrier fluid component P is a matrix relating absorbance to concentration A is a matrix of absorbances.

13. The apparatus of claim 10, further comprises a replenishing system for supplying the first component and the second component to said supply vessel in response to the concentration thereof calculated by said calculating means.

14. The apparatus of claim 13, wherein said replenishing system comprises:

a first carrier fluid vessel coupled to said supply vessel;

a second carrier fluid vessel coupled to said supply vessel; and means, responsive said calculating means, for metering dispensing of the first carrier fluid component from said first carrier fluid vessel and the second carrier fluid component from said second carrier fluid vessel into said supply vessel.

15. The apparatus of claim 10, wherein the first vapor pressure carrier fluid has substantially higher vapor pressure than the second vapor pressure carrier fluid.

16. An apparatus according to claim 14, wherein the carrier fluid mixture, further comprises a thermoplastic resin.

17. The apparatus of claim 16, wherein C is the matrix of concentrations of first vapor pressure carrier fluid, second vapor pressure carrier fluid and thermoplastic resin.

* * * * *